April 3, 1951 T. YONKLER 2,547,425
SCREEN FOR TAKING MEASUREMENTS FROM PROJECTIONS
Filed July 15, 1948 3 Sheets-Sheet 2
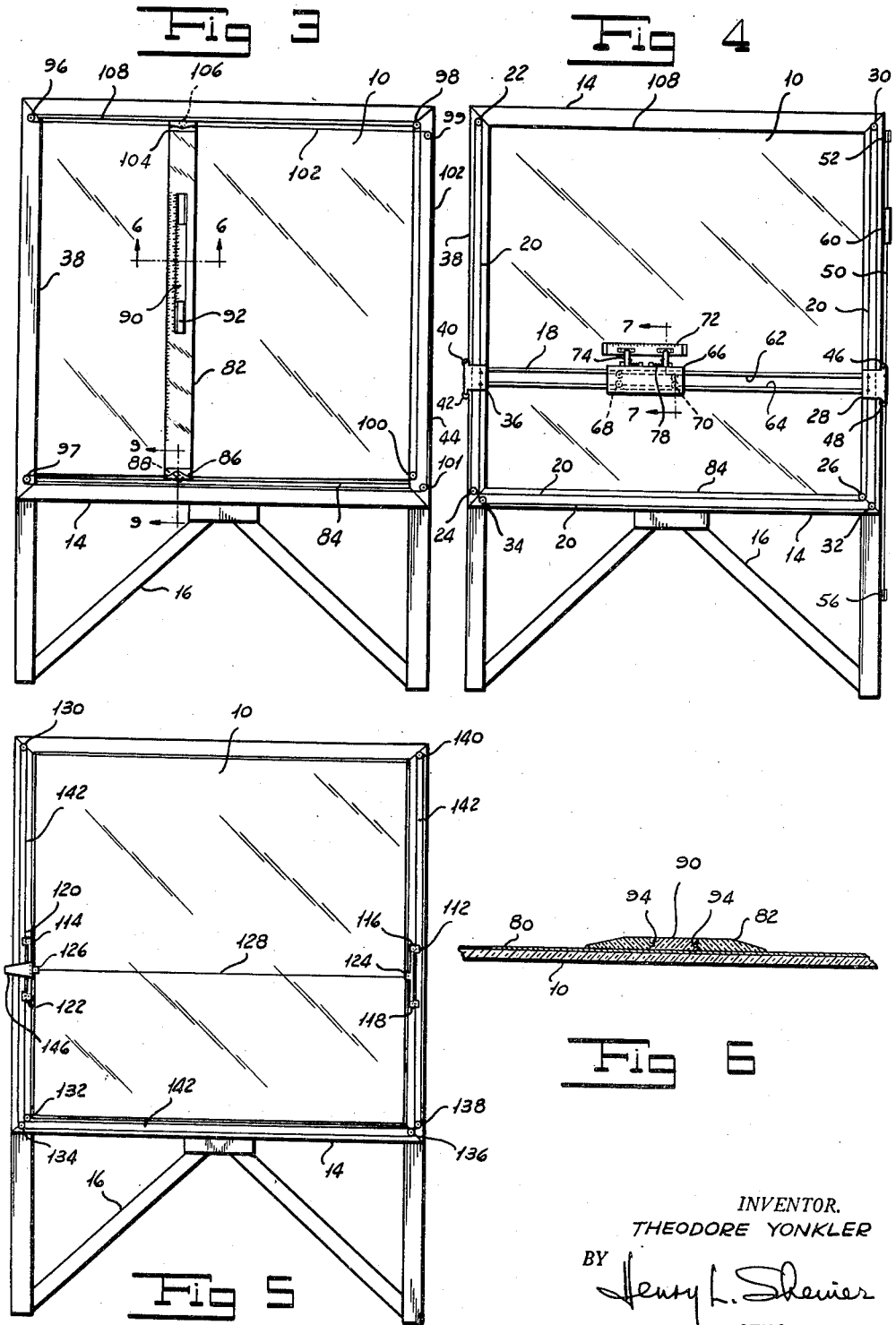
INVENTOR.
THEODORE YONKLER
BY Henry L. Shevier
ATTORNEY April 3, 1951     T. YONKLER     2,547,425
SCREEN FOR TAKING MEASUREMENTS FROM PROJECTIONS
Filed July 15, 1948     3 Sheets-Sheet 3
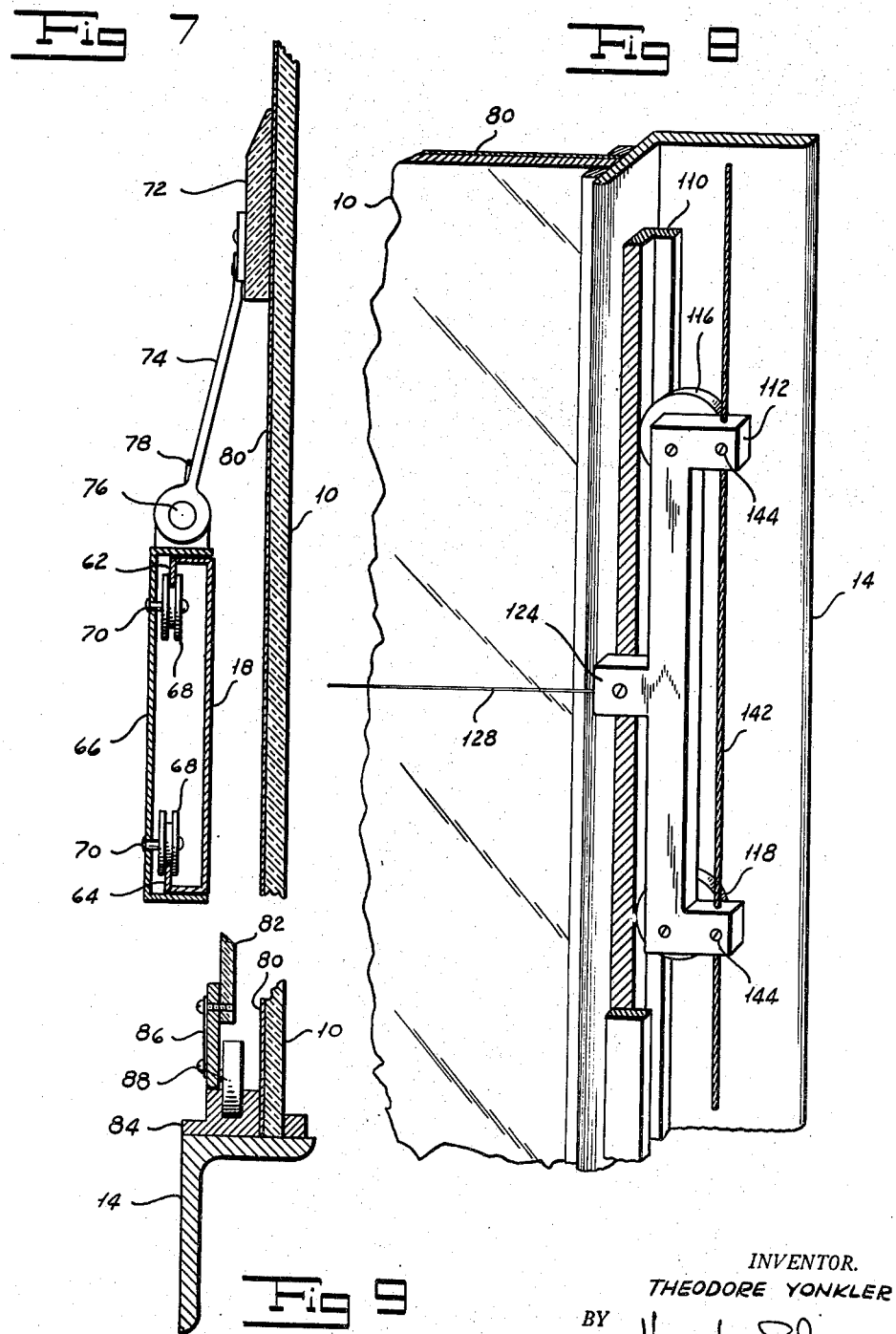
INVENTOR.
THEODORE YONKLER
BY Henry L. Shevier
ATTORNEY Patented Apr. 3, 1951

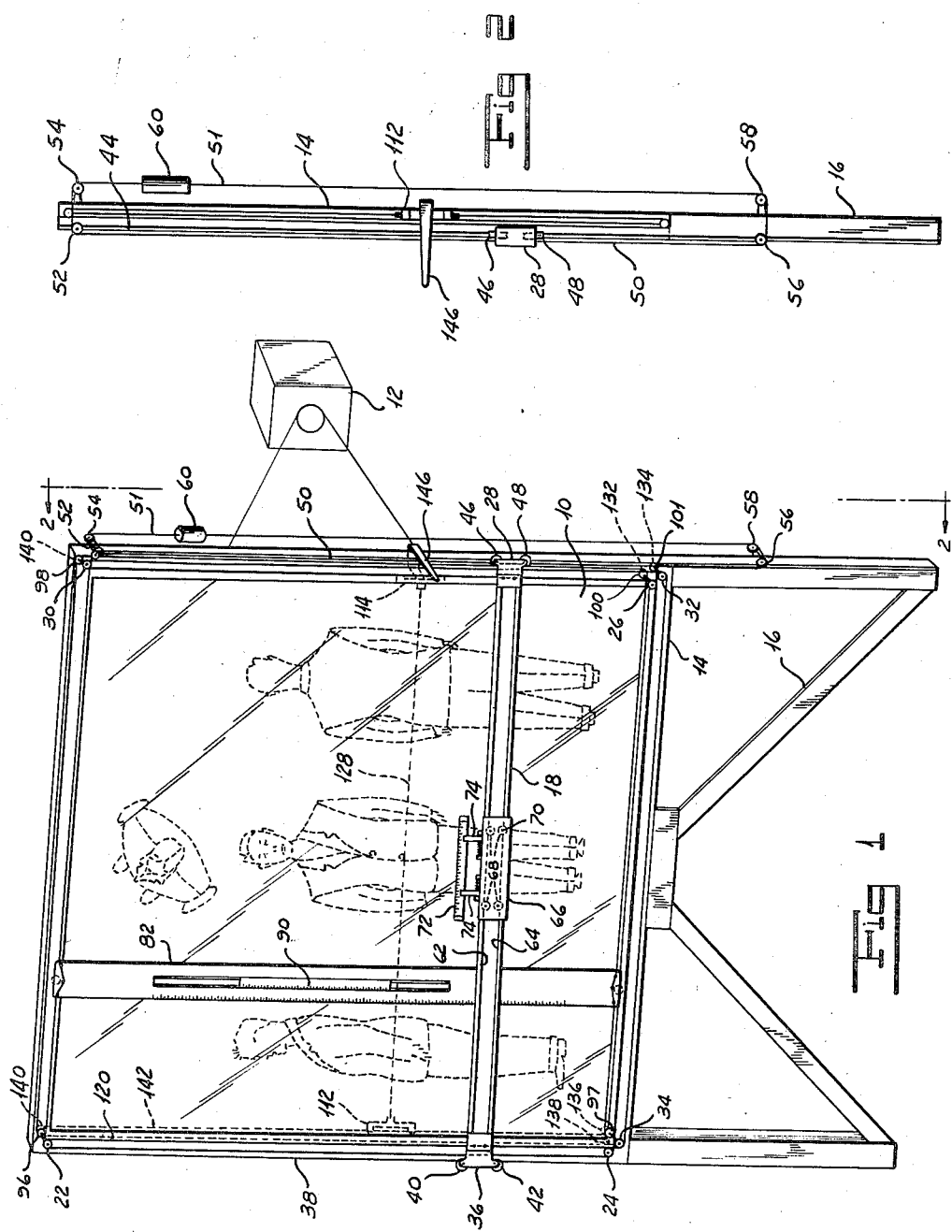

2,547,425

UNITED STATES PATENT OFFICE 2,547,425

SCREEN FOR TAKING MEASUREMENTS FROM PROJECTIONS

Theodore Yonkler, Bronx, N. Y., assignor to The Henry Booth Methods Corporation, New York, N. Y., a corporation of Delaware Application July 15, 1948, Serial No. 38,938

9 Claims. (Cl. 33—2)

My invention relates to a screen for taking measurements from projections.

In co-pending application of Henry Booth, Serial #616,117, filed September 13, 1945, a photographic fitting method is disclosed in which a number of aspects of a person to be fitted with articles of apparel are simultaneously photographed and a transparency of said photograph is projected by rear projection to a screen to a predetermined scale so that measurements may be taken from the photograph from which measurements articles of apparel may be cut and made.

One object of my invention is to provide a screen formed of translucent material upon which a transparency may be projected provided with an improved arrangement of measuring scales whereby various measurements may be expeditiously, conveniently and accurately taken.

Another object of my invention is to provide a projection screen formed of translucent material provided with means for providing for the projection of a reference line which may be readily adjusted to any desired horizontal position.

Another object of my invention is to provide a projection screen for obtaining measurements from projected images in which means are provided for forming the projection of a horizontal reference line and in which scales are provided for taking measurements in a vertical direction from the predetermined reference line.

Other and further objects of my invention will appear from the following description.

In the accompanying drawings which form part of the instant specification and which are to be read in conjunction therewith, and in which like reference numerals are used to indicate like parts in the various views:

Figure 1 is a perspective view showing a projection screen for the taking of measurements containing one embodiment of my invention.

Figure 2 is the side elevation taken along the line 2—2 of Figure 1.

Figure 3 is a front elevation similar to Figure 1, showing the screen and only the vertically positioned scales.

Figure 4 is a view similar to Figure 3 showing only the horizontally positioned scales.

Figure 5 is a rear elevation of the screen showing the horizontally positioned wire adapted to form the projection of a horizontal reference line.

Figure 6 is a fragmentary view drawn on an enlarged scale taken along the line 6—6 of Figure 3.

Figure 7 is a fragmentary sectional view drawn on an enlarged scale taken along the line 7—7 of Figure 4.

Figure 8 is a perspective view with parts broken away drawn on an enlarged scale showing details of construction in the mounting of the reference wire.

Figure 9 is a fragmentary sectional view drawn on an enlarged scale taken along the line 9—9 of Figure 3.

In general, my invention contemplates the provision of a framework supporting a translucent screen of appropriate size, against the rear of which the transparency containing the images from which measurements are to be taken is projected. The framework carries a horizontal scale assembly provided with parallel motion means whereby the horizontal assembly may be moved up and down to any desired position on the scale. The horizontally positioned support carries a small scale adapted to be moved from side to side on suitable guides carried by the horizontally positioned carrier. A vertically positioned scale assembly is likewise provided with a parallel motion arrangement whereby the vertically positioned scale may be moved from side to side to any desired point upon the screen. The main vertical scale carries an auxiliary scale slidable in a vertical direction and adapted to take measurements from the reference line. The reference line is created by a wire positioned adjacent the rear of the screen in a parallel motion carriage whereby the reference wire may be moved up and down to provide a reference line at any desired point. The main horizontally positioned scale assembly is provided with a counterweight permitting easy movement of the horizontal assembly either in an upward or downward direction.

More particularly, referring now to the drawings, the screen 10 is formed of translucent material such as milk glass, ground glass, or the like, against the rear of which a projector 12 is adapted to throw an image. Ordinarily, the images used are formed by a photographic transparency susceptible to projection. It is understood, of course, that any suitable projection arrangement may be employed, as, for example, those adapted to project opaque photographs through an optical arrangement, as is well known in the art.

The screen 10 is housed in a frame 14 which is supported in any suitable manner, as, for example, by a base frame 16. If desired, the screen may be suspended from the ceiling of a room or projected horizontally from a wall. It is necessary only that the position of the projector 12 and the position of the screen 10 be such that no distortion is produced in the projection.

A horizontally positioned carrier member 18 is mounted for movement in a vertical direction in a parallel motion arrangement. It is understood, of course, that any suitable parallel motion mechanism may be employed. As can readily be seen by reference to Figures 1 and 4, the mounting I employ comprises six pulleys and a flexible member such as a flexible wire cable, or the like.

The flexible cable 20 is attached at the left hand end of carrier 18 and extends upwardly over a pulley 22 and downwardly over a pulley 24 and thence to the right over a pulley 26 and upwardly to a point where it is secured to the right hand side 28 of the carrier 18. The flexible member 20 then continues upwardly over pulley 30, reversing direction, and moving downwardly over pulley 32, thence to the left over pulley 34 and upwardly to a point where it is secured to the left hand side 36 of the carrier 18. The arrangement is such that, when the left hand side of carrier 18 is moved upwardly, the flexible member will cause the right hand side of the carrier 18 to be moved upwardly an identical amount, thus insuring that the carrier 18 will move with a parallel motion.

The extreme left hand side of the frame 14 is provided with a flange 38 forming a track on which guide wheels 40 and 42, attached to the left hand side 36 of the carrier 18, are adapted to roll. Similarly, the right hand edge of the framework 14 is provided with a flange 44, forming a track on which wheels 46 and 48, carried by the right hand side 28 of the horizontal member 18, are adapted to roll. A flexible member 50 is secured to the right hand portion 28 of the carrier 18 and extends over a pair of upper pulleys 52 and 54 and over a pair of lower pulleys 56 and 58. A counterbalancing weight 60 is secured to the rear portion 51 of the flexible member 50 and serves to counterbalance the weight of the horizontal carrier 18 and its associated scales.

The horizontal carrier 18 is formed with a pair of flanges 62 and 64 on which the scale carriage 66 is adapted to roll. The construction of the scale carriage 66 can best be seen by reference to Figure 7 in which wheels 68, journalled upon suitable pins 70, engage the flanges 62 and 64 so that the carriage 66 may be moved from side to side upon the carrier 18. The scale 72 is formed of transparent material and is supported by a pair of arms 74. These arms are pivotally carried around a pivot pin 76 supported by the carriage 66. A pair of springs 78 rotate the arms 74 in a clockwise direction as viewed in Figure 7 so as to bring the scale 72 against the surface 80 of the translucent screen 10. The surface 80 may be such that it can readily take pencil marks, if desired, which may be washed or erased with ease. The scale 72 may be calibrated in any suitable manner and in accordance with the predetermined scale of projection. The scale 72 is employed to take measurements extending in a horizontal direction.

Referring now to Figures 1 and 3, the vertically-disposed scale 82 is supported for movement in the bottom channel member 84 carried by the frame 14. The bottom of the vertical scale 82 terminates in the bracket 86 which carries a wheel 88 adapted to be disposed in the re-entrant portion of the channel 84, as can readily be seen by reference to Figure 9.

The main scale 82 carries an auxiliary scale 90 adapted to be moved upwardly and downwardly in a slot 92 formed in the main vertical scale 82. Both the movable scale 90 and the main scale 82 are formed of transparent or translucent material and are positioned to lie closely adjacent the screen proper 10. The main scale 82 is formed with tongues 94 adjacent the slot 92, adapted to seat in grooves formed in auxiliary scale 90, as can be seen readily by reference to Figure 6. The vertically-disposed scale 82 is provided with a parallel motion arrangement similar to that described with respect to the carrier 18 and comprising six pulleys 96, 97, 98, 99, 100 and 101, over which a flexible member 102 is passed. The flexible member 102 is attached to the upper bracket 104 of the vertical scale 82 and extends to the left over pulley 96, thence upwardly and horizontally to the right over pulley 98 and downwardly over pulley 100 and thence to the left for attachment to the lower bracket 86 of the vertical scale 82. The flexible member then continues to the left over pulley 97, downwardly and to the right over pulley 101, thence upwardly over pulley 99 and to the left for attachment to the upper bracket 104 of the scale 82. Any movement of the upper portion of the scale will produce a corresponding movement of the lower portion of the scale due to the arrangement just described. It will be understood of course that any other suitable parallel motion arrangement may be employed, if desired, which will leave the screen 10 clear of the parallel motion elements. The upper bracket 104 is similar to the lower bracket 105 and is provided with a wheel 106 which runs in an upper channel 108 similar to channel 84.

Referring now to Figures 5 and 8 which show the reference wire and its mounting, there is secured to the frame 14 a pair of channel members 110, one disposed on each side of the frame 14. A pair of carriages 112 and 114 are provided, one at the right hand side and one at the left hand side of the rear of the screen as can readily be seen by reference to Figure 5. Journalled to the carriage 112, I provide a pair of wheels 116 and 118 adapted to ride in the right hand channel 110. Similarly, the left hand carriage 114 is provided with a pair of wheels 120 and 122 adapted to ride in the left hand channel 110. A lug 124 is formed on the right hand carriage 112 and a lug 126 is formed on the left hand carriage 114. A wire 128 is stretched between the lugs 124 and 126, closely adjacent the rear of the screen 10. A parallel motion arrangement similar to that described above comprising six pulleys 130, 132, 134, 136, 138, 140 and a flexible member 142 are provided to insure that the carriers 112 and 114 will move upwardly and downwardly through exactly the same distance and thus keep the wire 128 on a horizontal position. The flexible member 142 is secured to the carrier 114 and extends upwardly along the left hand side of the rear of the screen over pulley 130, thence downwardly over pulley 134, then to the right over pulley 136 and upwardly where it is secured to carrier 112. The flexible member 142 then continues upwardly over pulley 140, thence downwardly over pulley 138, thence to the left over pulley 132 and upwardly for attachment to the left hand carrier 114. The flexible member 142 extends through the carrier in a manner shown in Figure 8, there being clamping screws 144 which secure the carrier to the flexible member 142. When the clamping screws 144 are loosened, the carrier can be adjusted to assure that the reference wire 128 is in a horizontal position.

The carrier 114 is provided with a bracket 146 which extends to the front of the screen as can readily be seen by reference to Figures 5, 1 and 2. This bracket enables the adjustment of the reference wire from the front of the screen. Since the parallel motion arrangement causes one of the carriers to move agreeable to the movement of the other of the carriers, the entire horizontal reference wire 128 can be adjusted by moving the handle 146 upwardly and downwardly.

The zero mark of the vertical scale 82 is positioned at a point marking the floor upon which the figure projected is supported so that overall heights from the floor level can be readily measured by the vertical scale 82. The reference line 128 is positioned at some predetermined point which may be, for example, at the bottom of the arm scye of the coat or at any other desired point. The auxiliary scale 90 is adapted to take measurements with respect to the horizontal reference line 128. If, for example, my improved projection screen is to be used for taking measurements in connection with photographs produced by the apparatus and photographic fitting method disclosed in the above-mentioned copending application of Henry Booth, any number of measurements may be quickly, conveniently and expeditiously taken. The length of the coat, the length of the sleeves, the length of the inner seam of the trousers, the width of the cuff of the trousers, the width of the trousers at the knee, the width of the shoulders, the height of one shoulder with respect to the other, the width of the waist, the width of the hips, the length of the back of the coat and numerous other measurements may be rapidly and accurately taken. The scales are calibrated for the scale of the projection so that direct readings may be taken from the projected images.

It will be seen that I have accomplished the objects of my invention. I have provided a screen formed of translucent material upon which an image may be projected to a predetermined scale and any desired number of various measurements may be quickly, expeditiously, conveniently and accurately taken. Means are provided for the provision of a reference line which may be readily adjusted to any desired horizontal position. Measurements may be taken both in a vertical direction and in a horizontal direction on the projected images. Then too, measurements may be taken from the reference line by means of the auxiliary vertical scale.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A screen for taking measurements from projections including in combination a substantially vertical frame, a translucent sheet of material supported by said frame having a surface lying substantially along a plane, a vertically disposed scale positioned adjacent the front of said screen for movement in a horizontal direction, parallel motion means for said vertically disposed scale constraining it to occupy positions parallel to itself when the scale is moved in a horizontal direction, a horizontally positioned scale, means for mounting said scale for movement in a vertical direction, parallel motion means for said horizontally positioned scale, a carrier mounted on each side of the frame for movement in a vertical direction upon said frame, an elongated horizontal member supported by said carriers and positioned adjacent the rear of said screen, parallel motion means for said carriers, the construction being such that when a transparency is projected against said screen said elongated member is adapted to produce a reference line upon said screen.

2. A screen as in claim 1 including in combination a horizontally disposed support, a carriage mounted on said support for movement therealong, said horizontal scale being carried by said carriage.

3. A screen as in claim 1 including in combination a horizontally disposed support, a carriage mounted on said support for movement therealong, said horizontal scale being pivotally carried by said carriage for rotation away from and toward the surface of said screen.

4. A screen as in claim 1 including in combination a horizontally disposed support, a carriage mounted on said support for movement therealong, said horizontal scale being pivotally carried by said carriage for rotation away from and toward the surface of said screen, and means for biasing said horizontal scale to a position contacting the surface of said screen.

5. A screen as in claim 1 including in combination a horizontally disposed support, a carriage mounted on said support for movement therealong, said horizontal scale being carried by said carriage, said parallel motion means being attached to said support and counterbalancing means enabling the ready movement of said support and said horizontal scale in a vertical direction.

6. A screen as in claim 1 in which said vertically positioned scale is provided with an auxiliary scale, means for mounting said auxiliary scale on said main vertically positioned scale for vertical movement with respect to said vertical scale.

7. A screen as in claim 1 in which said scales are made of translucent material.

8. A screen as in claim 1 in which one of said carriers for the elongated member is provided with means extending to the front of the screen for the ready positioning of said elongated member.

9. A screen as in claim 1 in which said parallel motion means include flexible members and a plurality of pulleys carried by the frame.

THEODORE YONKLER.

REFERENCES CITED

The following references are of record in the file of this patent:

UNITED STATES PATENTS

| Number | Name | Date |
|---|---|---|
| 347,099 | Feron | Aug. 10, 1886 |
| 533,387 | Viehaber | Jan. 29, 1895 |
| 802,202 | Dougan | Oct. 17, 1905 |
| 814,789 | Mackintosh | Mar. 13, 1906 |
| 1,436,673 | Nunamaker | Nov. 28, 1922 |
| 1,992,083 | McDonald | Feb. 19, 1935 |
| 2,034,529 | Olsen | Mar. 17, 1936 |
| 2,109,065 | Haselton | Feb. 22, 1938 |
| 2,159,035 | McGrath | May 23, 1939 |
| 2,190,947 | Kinzler | Feb. 20, 1940 |
| 2,222,297 | Mesjian | Nov. 19, 1940 |
| 2,263,101 | Perry | Nov. 18, 1941 |
| 2,296,928 | Briechle | Sept. 29, 1942 |
| 2,422,611 | Becker | June 17, 1947 |
| 2,430,862 | Carscallen | Nov. 18, 1947 |

FOREIGN PATENTS

| Number | Country | Date |
|---|---|---|
| 264,911 | Great Britain | Jan. 24, 1927 |
| 758,595 | France | Nov. 3, 1933 |